June 1, 1965 T. NOVACK 3,186,823
MELTING APPARATUS
Filed Jan. 4, 1962
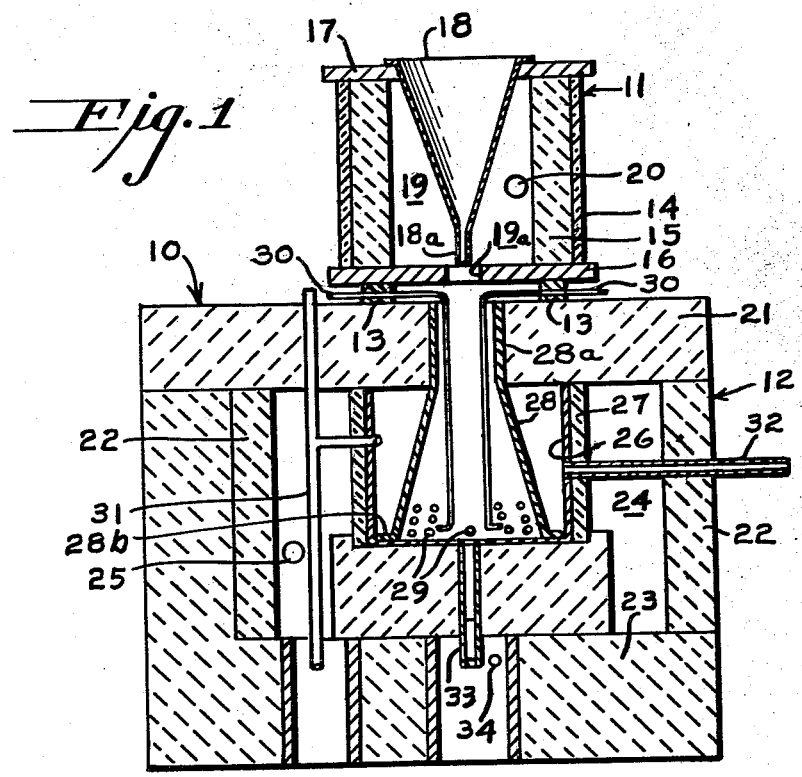
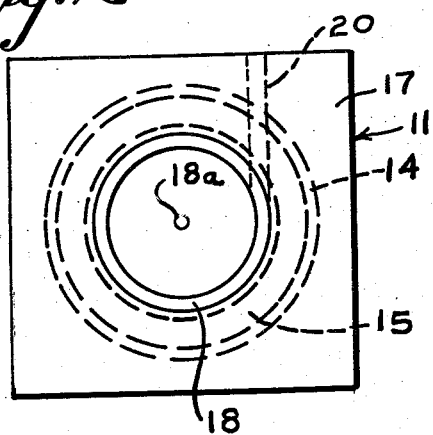
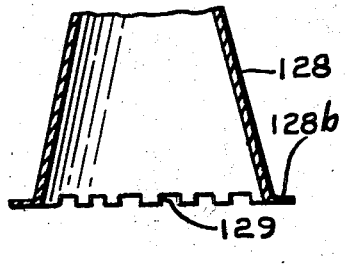
INVENTOR.
THEODORE NOVACK
BY
Clarence R. Patty, Jr.
ATTORNEY

United States Patent Office 3,186,823
Patented June 1, 1965

3,186,823
MELTING APPARATUS
Theodore Novack, Big Flats, N.Y., assignor to Corning Glass Works, Corning, N.Y., a corporation of New York
Filed Jan. 4, 1962, Ser. No. 164,338
5 Claims. (Cl. 65—335)

This invention relates to melting apparatus, and more particularly to improved apparatus for melting and fining vitreous or glass-like materials.

The melting and fining of speciality glasses, especially those which are readily crystallizable or devitrifiable, has produced problems which have rendered the known types of melting apparatus completely unacceptable. Although many of the specialty glasses are relatively hard glasses and processed at compartively high temperatures, which of course facilitate fining, the problem of undesirable crystallization still exists. I have found that when raw batch is charged directly into a melt of such readily devitrifiable specialty glasses, the thermal shock of the relatively cold batch produces random crystallization and segregation within the melt, resulting in the production of a heterogeneous composition. In order to alleviate the problem of crystallization I deemed it advisable to premelt the charge and continuously deliver such charge in a molten condition to a fining chamber. However, due to the relatively high softening point and surface tension peculiar to some specialty glasses, a premelter had to be designed which would not only efficiently and continuously melt such specialty glasses without incurring the undesirable devitrification or crystallization, but also which would facilitate the continuous flow of such high surface tension glasses to provide a practical flow rate to the finer.

In brief, my invention encompasses the utilization of an inverted conical premelter which provides a relatively large surface area per unit volume to facilitate the melting of the batch supplied thereto without devitrification. The premelter is positioned above a refining chamber or crucible having a hollow frusto-conical baffle member positioned therewithin, and into which the molten charge from the premelter is initially directed. The baffle is provided with a plurality of orifices or openings adjacent the bottom thereof, through which molten material must pass before being discharged from the fining tank or chamber. This particular baffle construction not only lends considerable strength to the cylindrical tank, but also insures that the molten material is maintained within the fining tank for a period necessary for adequate fining.

It thus has been an object of my invention to provide improved melting apparatus for melting and fining vitreous or glass-like materials.

A further object of my invention has been to devise novel construction for a premelter which not only provides efficient melting of raw batch, but which also facilitates the delivery of the molten charge therefrom.

An additional object of my invention has been to provide an improved fining tank having a novel baffle construction which retains the molten charge delivered thereto for a period of time sufficient to insure complete fining before it is discharged from the tank.

These and other objects of my invention will be more apparent to those skilled in the art from the following disclosure and accompanying drawings in which:

FIGURE 1 is a side elevational view in section of an improved melting and fining apparatus embodying my invention;

FIGURE 2 is a top plan view of the premelter shown in FIGURE 1; and,

FIGURE 3 is a fragmental side elevational view in section of a modified baffle which may be utilized in the fining tank shown in FIGURE 1.

Referring now to the drawings and particularly FIGURES 1 and 2, the melting apparatus 10 is composed of two main parts comprising a premelter 11 and a refining tank or chamber 12. The premelter 11 is positioned above the fining tank 12 and is preferably spaced apart therefrom by means of blocks 13 which provide an opening or outlet between the premelter and the refiner for gases emanating from the refining tank.

The premelter 11 comprises an outer cylindrical refractory tube or shell 14, an inner concentric refractory lining such as high temperature castable cement 15, and a refractory bottom slab 16 and cover plate 17. An inverted cone or conical chamber 18 is fitted into an opening formed in the cover plate and may extend downwardly through an orifice in the bottom slab. A firebox 19 is formed between the cone 18 and the inner lining 15, and heat is supplied thereto by a burner 20 which fires tangentially about the inner surface of the liner 15.

In order to prevent the contamination of the specialty glasses to be melted by such unit, many of which are extremely incompatible with ordinary refractories, the conical chamber 18 is preferably made of platinum or platinum-rhodium alloys. To achieve maximum melting efficiency I have found that it is necessary to construct the conical chamber in such a manner so that a large surface area per unit volume is produced. Although cones with larger divergent angles may be utilized, I prefer to maintain the angle between the side wall portions and the axis of the cone below 15 degrees. With larger angles, not only is the proportion between surface area and unit volume decreased, but also the effectiveness of draining the melted batch from the premelter is materially reduced.

The premelter 11 is shown resting on blocks 13 which are positioned on a refractory cover plate 21 of the refining chamber 12. Refractory liners 22 and base plates 23 cooperate with the cover plate 21 to form a firebox or combustion chamber 24 within the refining chamber 12. Heat may be supplied thereto by means of a plurality of burners 25 of the type utilized in the premelter. A fining crucible 26, preferably of platinum or platinum-rhodium alloy, backed by a refractory liner 27, is positioned within the chamber 24.

Although the lower cylindrical end portion 18a of the inverted cone 18 is shown extending downwardly adjacent an exhaust port 19a and terminating above a cylindrical upper portion 28a of a frusto-conical baffle member 28 positioned within the fining crucible 26, it may extend through the port and terminate adjacent portion 28a if desired. As shown, the cylindrical portion 28a of the baffle member 28 extends upwardly through an opening formed in the cover plate 21 and initially receives the molten batch supplied by the conical chamber 18 of the premelter 11. A flange portion 28b may extend radially outwardly from the lower end of the baffle member 28 to facilitate the positioning and centering of the baffle member within the fining crucible 26. A plurality of openings or annular orifices 29 extend through the baffle member 28 adjacent a lower portion thereof. Bubbler tubes 30 may be positioned within the baffle member 28 to facilitate the fining of the material delivered thereto.

A vented overflow pipe 31 communicates with the fining crucible 26 to maintain a substantially constant glass level therewithin. An outlet or delivery tube 32 communicates with a side wall portion of the fining crucible 26 below the glass level maintained by the overflow pipe 31. A normally closed or frozen drain tube 33 communicates with the bottom portion of the fining crucible 26. A burner 34 is positioned adjacent the outlet end of the drain tube 33 to melt the frozen plug inherently formed within the tube 33, and thereby facilitate the changing of the melt composition within the crucible by providing means for quickly draining the melt contained therewithin.

Referring now to FIGURE 3 a fragmental section of a modified frusto-conical baffle 128 is shown which may be utilized in the fining crucible 26 of FIGURE 1. The modified member 128 like baffle member 28, has radially extending flange portions 128b which are utilized to position and center the baffle member within the fining crucible 26. However, in place of the annular orifices present in baffle member 28, the member 128 has a plurality of rectangular saw-tooth openings 129 adjacent the bottom thereof which provide for the egress of the molten glass-like material delivered to the baffle member from the premelter.

In operation, solid batch material is delivered to the inverted cone or conical chamber 18. The burner 20, which is directed tangentially about the inner surface of the liner 15, supplies an even heat to the inclined wall portions of the cone 18 to melt the batch in contact with such wall portions. The melted batch is delivered downwardly along the inner surface of the cone 18 and outwardly through the lower cylindrical portion 18a where it is charged in a molten condition into the interior of the frusto-conical baffle member.

The molten charge delivered to the frusto-conical baffle member must pass through the openings formed adjacent the bottom thereof before being discharged from the fining crucible 26 through outlet or delivery tube 32. Although the molten charge delivered to the baffle member has a tendency to egress through the openings in the bottom thereof to seek its own level within the crucible 26, the material is maintained within the baffle member a sufficient period to insure complete fining. The utilization of bubbler tubes 30 facilitates and enhances the degree of fining obtained. Gases removed from the melt are free to egress from the cylindrical upper portion of the baffle member through the space formed between the premelter and the cover plate by means of the block 13 to the atmosphere.

The overflow pipe 31, which is vented to the atmosphere, maintains the glass level within the crucible at a substantially constant level above the outlet or delivery tube 32.

The melting apparatus 10 is extremely versatile and may be adapted to various specialty glasses. When it is desired to change the glass being melted and fined, the crucible 26 may be easily drained by energizing the burner 34 to melt the normally frozen plug formed in the end of the drain tube 33, whereupon all of the molten material within the crucible 26 will be drained therefrom. Accordingly the premelter may be emptied and recharged with the new material to be melted or an additional premelter containing the new batch may be substituted, and the operation renewed with the new material.

Although I have disclosed apparatus employing the now preferred embodiment of my invention, it will be readily apparent to those skilled in the art that various changes, modifications and additions may be made thereto without departing from the spirit and scope of the invention as defined in the appended claims.

I claim:

1. A two-zone apparatus for transforming solid batch material into a homogeneous molten mass comprising, a first zone for melting solid batch material and delivering it to a second zone for fining, said first zone being positioned above said second zone, said first zone including an inverted conically-shaped container having an open upper end portion for receiving solid batch material and a lower open end portion for delivering molten charge therefrom, said second zone including a receptacle positioned below said lower end of the conically-shaped container for collecting and refining the molten charge delivered by such lower open end portion, an enclosing baffle member positioned within and extending above said receptacle in axial alignment with said lower open end portion for initially receiving therewithin the molten charge from said lower end, a heated refractory housing surrounding said receptacle and closing the upper end thereof to the atmosphere, said baffle member extending upwardly through said refractory housing and communicating with the atmosphere intermediate said first and second zones to facilitate the removal of gases from the molten charge within such baffle, means adjacent a bottom portion of said baffle member for flowing refined molten material from the interior thereof to the remainder of said receptacle, and discharge means communicating with a side wall portion of said receptacle below the surface of the molten material retained therein for delivering such material.

2. Apparatus as defined in claim 1 wherein a drain tube communicates with a bottom portion of said crucible and extends downwardly threfrom a sufficient distance so that a frozen plug of the material being treated is formed therewithin, and a burner unit is positioned adjacent the lower end of said drain tube to fuse the frozen plug and facilitate the draining of the molten material from the crucible.

3. Melting and refining apparatus for transforming solid batch material into a homogeneous molten mass comprising, a premelter for continuously melting solid batch material into a molten charge, a closed refining chamber positioned below said premelter to receive the molten charge therefrom, means for heating the refining chamber to maintain the molten charge delivered thereto in a molten condition, an upwardly open hollow baffle member positioned within and extending upwardly through said refining chamber in axial alignment with a discharge opening of said premelter for initially receiving the molten charge from said premelter, agitating means within said hollow baffle member for fining the molten material retained therein, the upper end of said upwardly-open hollow baffle member which extends through said defining chamber being vented to the atmosphere to facilitate the removal of gases from the agitated molten material retained within the hollow baffle member, a plurality of openings formed in said baffle member adjacent a bottom portion thereof for flowing fined molten material radially outwardly from the interior of said baffle member to the remainder of said refining chamber, overflow means for maintaining a substantially constant level of molten material within said refining chamber, and outlet means communicating with a side wall portion of said refining chamber below said overflow means for delivering the refined molten mass from said refining chamber.

4. Improved apparatus for melting and fining fusible batch material comprising, a melting chamber for melting solid batch material and delivering such batch material in a molten state to a refining vessel, a refractory housing surrounding and enclosing said refining vessel from the atmosphere, means within said housing for supplying heat to said refining vessel and maintaining the fused batch delivered thereto in a molten condition, a hollow frusto-conical baffle member positioned within said refining vessel and extending upwardly through said refractory housing in close adjacency with said melting chamber to initially receive the molten charge from said melting chamber, bubbler means positioned within said hollow baffle member for refining the molten material delivered thereto, said baffle member being vented at its upper end directly to the atmosphere to facilitate the removal of gases discharged from the molten mass retained therein, a plurality of passageways communicating between the interior of said baffle member and the refining vessel to facilitate the deliverance of refined material from said baffle member to the remainder of said refining vessel, and means communicating with the molten material within the refining vessel intermediate its upper and lower extent for withdrawing the refined molten material from said refining vessel.

5. Improved apparatus for melting and fining glass-like compositions comprising, a melting chamber and a refining chamber, said melting chamber having an upper inlet opening for receiving solid batch material and a lower outlet opening for delivering such batch material in a molten state to the refining chamber, an upwardly open crucible positioned within said refining chamber, a refractory housing surrounding said crucible and closing the upper end thereof to the atmosphere, a hollow baffle member of frusto-conical shape positioned within said crucible and extending upwardly through said refractory housing in axial alignment with the outlet opening of said melting chamber to initially receive the molten batch from said melting chamber, bubbler means positioned within said baffle member to facilitate refinement of the molten material delivered thereto, said baffle member being vented at its upper end directly to the atmosphere intermediate said melting chamber and said refining chamber to provide for the removal of gases expunged from the molten material retained therewithin, a plurality of passageways adjacent a bottom end portion of said baffle member communicating between the interior and exterior thereof for passing the refined material radially outwardly from said baffle member to the remainder of said crucible, a combustion chamber within said housing and surrounding said crucible for maintaining material delivered thereto in a molten condition, overflow means for maintaining a substantially constant glass level within said crucible, and outlet means communicating with the side wall portions of said crucible below said overflow means for delivering refined molten material therefrom.

References Cited by the Examiner

UNITED STATES PATENTS

| | | | |
|---|---|---|---|
| 485,788 | 3/92 | Epstein | 65—247 X |
| 1,421,211 | 6/22 | Good | 65—335 X |
| 1,575,514 | 3/26 | Shively | 65—335 X |
| 1,897,973 | 2/33 | Wadman | 65—347 X |
| 2,641,454 | 6/53 | Labino | 65—178 X |
| 2,688,469 | 9/54 | Hohmann | 65—180 X |
| 2,762,167 | 9/56 | De Voe | 65—178 X |
| 3,057,175 | 10/62 | Rough et al. | 65—178 |

DONALL H. SYLVESTER, *Primary Examiner.*

WILLIAM B. KNIGHT, *Examiner.*